United States Patent [19]

Yamamura et al.

[11] 3,809,872

[45] May 7, 1974

[54] TIME CALCULATOR WITH MIXED RADIX SERIAL ADDER/SUBTRACTION

[75] Inventors: Katsumi Yamamura; Mitsuhiro Goto, both of Suwa, Japan

[73] Assignee: Kabushiki Kaisha Suwa Seikosha, Tokyo, Japan

[22] Filed: Feb. 16, 1972

[21] Appl. No.: 226,921

[30] Foreign Application Priority Data

Feb. 17, 1971 Japan .................................. 46-6891

[52] U.S. Cl. .................................................. 235/170
[51] Int. Cl. ................................................. G06f 7/50
[58] Field of Search ............................... 235/170, 169

[56] References Cited

UNITED STATES PATENTS

| | | | |
|---|---|---|---|
| 3,621,219 | 11/1971 | Washizuka | 235/170 |
| 3,681,584 | 8/1972 | Wolf | 235/175 |
| 2,872,107 | 2/1959 | Burkhart | 235/170 |
| 3,089,644 | 5/1963 | Wensley | 235/169 |
| 3,159,740 | 12/1964 | Broce | 235/169 |
| 3,214,576 | 10/1965 | Propster, Jr. | 235/170 X |
| 3,584,206 | 6/1971 | Evans | 235/170 |

OTHER PUBLICATIONS

R. Townsend, "Serial Digital Adders For a Variable Radix of Notation," Electronic Engineering, Oct. 1953, pp. 410–416.

*Primary Examiner*—Eugene G. Botz
*Assistant Examiner*—David H. Malzahn
*Attorney, Agent, or Firm*—Waters, Roditi, Schwartz & Nissen

[57] ABSTRACT

A time calculating device characterized in that hours and minutes and perhaps seconds are directly set, times are added or subtracted, and the result of this calculation is obtained in hours, minutes and seconds. The times may also be multiplied or divided by an arbitrary figure, the result being obtained in hours, minutes and seconds or in other units. The time calculating apparatus comprises first and second calculators, the first calculator being adapted to receive and add or subtract two time figures and produce a result. The second calculator is adapted to receive and combine this result with a further figure. A means is provided coupling the first calculator to the second calculator for the transfer of the result to the latter. This means is responsive to the result and to a hexadic-decimal control signal for generating a decimal or hexadic correction signal which is transmitted to the second calculator as the aforesaid further figure for combination with the result. The time figures can be expressed as series of pulses and the aforesaid means includes a shift register to convert the result to parallel signals, there being provided a plurality of gates coupled to the shift register to detect when hexadic and decimal corrections are necessary and to generate an indicating signal for indicating the same.

3 Claims, 5 Drawing Figures

| | | ADD | | | | | | | | SUBTRACT | | | | | | | |
|---|---|---|---|---|---|---|---|---|---|---|---|---|---|---|---|---|---|
| DATA IN | 34 OR 35 | 0 | 0 | 0 | 0 | 0 | 0 | 0 | 0 | 1 | 1 | 1 | 1 | 1 | 1 | 1 | 1 |
| | 3 OR 27 | 1 | 1 | 0 | 0 | 1 | 1 | 0 | 0 | 1 | 1 | 0 | 0 | 1 | 1 | 0 | 0 |
| | 4 OR 28 | 1 | 0 | 1 | 0 | 1 | 0 | 1 | 0 | 1 | 0 | 1 | 0 | 1 | 0 | 1 | 0 |
| | 5 OR 29 | 1 | 1 | 1 | 1 | 0 | 0 | 0 | 0 | 1 | 1 | 1 | 1 | 0 | 0 | 0 | 0 |
| DATA PRODUCT | 6 OR 31 | 1 | 0 | 0 | 1 | 0 | 1 | 1 | 0 | 1 | 0 | 0 | 1 | 0 | 1 | 1 | 0 |
| | 7 OR 32 | 1 | 1 | 1 | 0 | 1 | 0 | 0 | 0 | 1 | 0 | 1 | 1 | 0 | 0 | 1 | 0 |

| | | | | | |
|---|---|---|---|---|---|
| | 1 | 2 | 5 | 4 | 2 |
| | 2 | 4 | 0 | 1 | 9 |

TIME CALCULATOR WITH MIXED RADIX SERIAL ADDER/SUBTRACTION

FIELD OF THE INVENTION

The present invention relates to electronic computers adapted for the calculation of time problems.

BACKGROUND OF THE INVENTION

Calculations, such as the addition and subtraction of times or wherein time is multiplied by a unitless figure or when a time is divided by a unitless figure, are extremely troublesome even when an abacus or a conventional computer table is used.

In performing the addition or subraction of times, if a change from a 1-second place to a 10-second place occurs or if a change from a 1-minute place to a 10-minute place occurs, a decimal place-up has to be madė; but, if a change from a 10-second place to a 1-minute place or a change from a 10-minute place to a 1-hour place occurs, a hexadic place-up has to be made. Thus, in order to perform addition or subtraction, it is required that mixed decimal and hexadic calculations be possible. However, in conventional devices constituted to make decimal calculations only, such as an abacus or computer, it is not possible to carry out time calculations simply.

SUMMARY OF THE INVENTION

It is an object of the invention to provide a calculator which enables carrying out calculations of time as easily as conventional calculators can make calculations with decimal numerals.

For example, in the case of the addition of 2 hrs. 42 mins. 15 secs. and 1 hr. 50 mins. 24 secs. in a conventional calculator, the seconds value is first obtained as 39 secs. from 15+24, then the minutes value is obtained as 92 mins. from 42+50 and from which, by subtracting 60, the minutes value is obtained as 32 mins. Next, by performing a place-up of 1 hr. and an addition of 2 hrs. + 1 hrs., the result of 4 hrs. 32 mins. 39 secs. is obtained. By way of comparison, in a calculator of the present invention, by setting the figures 2 42 15 and pushing an addition key and by setting the figures 1 50 24 and pushing the addition key again, a result will be obtained simply and at once.

To achieve the above and other objects of the invention, there is provided a time data handling apparatus comprising first and second calculators. The first calculator is adapted to receive and add or subtract two time figures such as has been indicated above and produce a result. The second calculator is adapted to receive and combine the result with a further figure. A means is moreover provided in accordance with the invention, coupling the first calculator to the second calculator for the transfer of the result to the latter. This means is responsive to the result and to a hexadic-decimal control signal for generating a decimal or hexadic correction signal which is transmitted to said second calculator as said further figure for combination with said result.

As a feature of the invention, the aforesaid time figures may be expressed as a series of pulses and the aforesaid means will include a shift register to convert said result to parallel signals and will further include a plurality of gates coupled to said shift register to detect when said hexadic and decimal corrections are necessary and to generate an indicating signal for indicating the same.

According to a further feature of the invention, there are provided first and second gates respectively coupled to sources of hexadic and decimal correction signals and to said plurality of gates for receiving the indicating signal from the latter. There being furthermore provided a hexadic-decimal selection means for selectively actuating one of said first and second gates.

According to still a further feature of the invention, the aforesaid circuitry will include delay means for delaying said indicating signal. Advantageously, there will be provided a means for controlling said calculators to add or subtract.

In a specific embodiment of the invention, the aforenoted plurality of gates is connected in feedback relationship with the first calculator, there being furthermore provided a flip flop connecting the first calculator with the above-mentioned delay means.

In accordance with still a further feature of the invention, there will be provided a source of timing signals generating a signal for each place in the time figures and a signal for each bit position in each said place, there being moreover provided a gate connected between said flip flop and delay means and actuated by timing signals corresponding to the first bit position in each said place.

Other objects, features and advantages of the invention will be found in the following detailed description.

DETAILED DESCRIPTION

Figure 1:
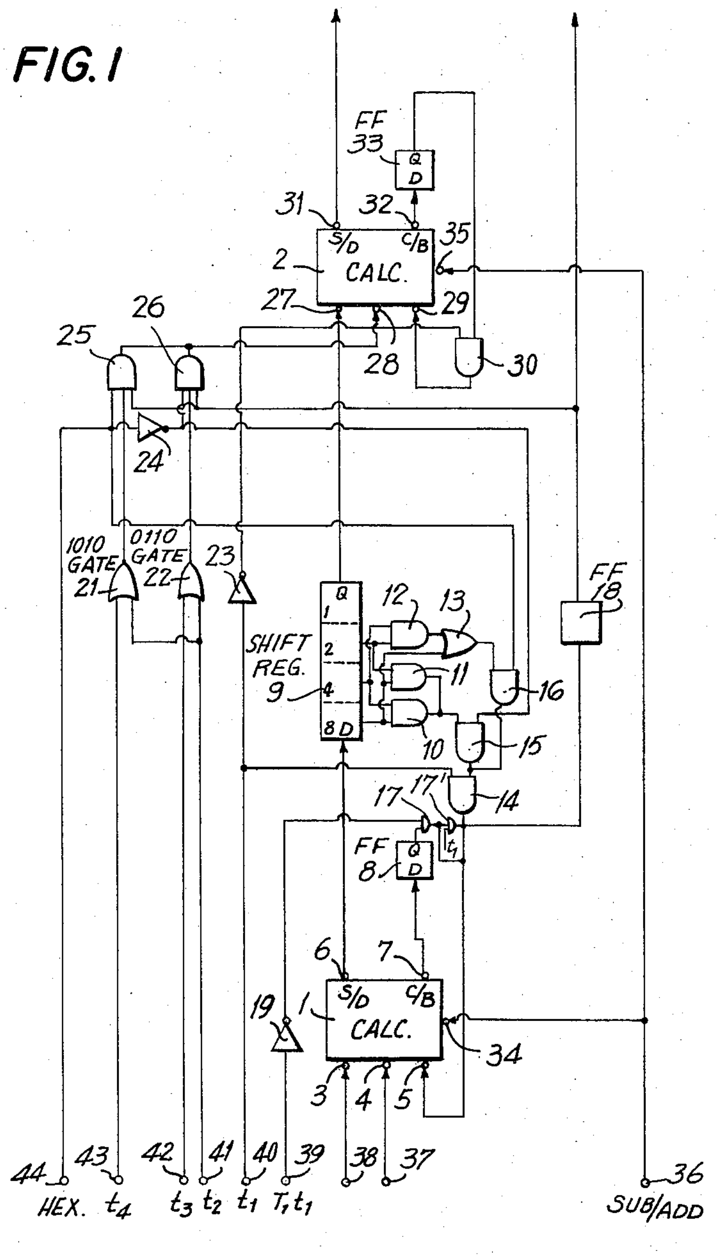
FIG. 1 is a circuit diagram for an addition-subtraction device of a calculating machine according to the invention.

In performing an addition or a subtraction, decimal place-ups (carries) are made when a change occurs from the 1-second place to the 10-second place and when a change is made from the 1-minute place to the 10-minute place. A hexadic place-up (carry) is made when a change occurs from the 10-second place to the 1-minute place or when a change occurs from the 10-minute place to the hour place, so that an addition-subtraction calculator capable of making decimal and hexadic calculations is required.

An example of such an addition-subtraction calculator is next explained referring to the drawing as follows:

FIG. 1 shows a circuit for an addition-subtraction calculator in which the data are arranged in series and the answer can be taken out with a delay of 4 bits.

Figure 4:
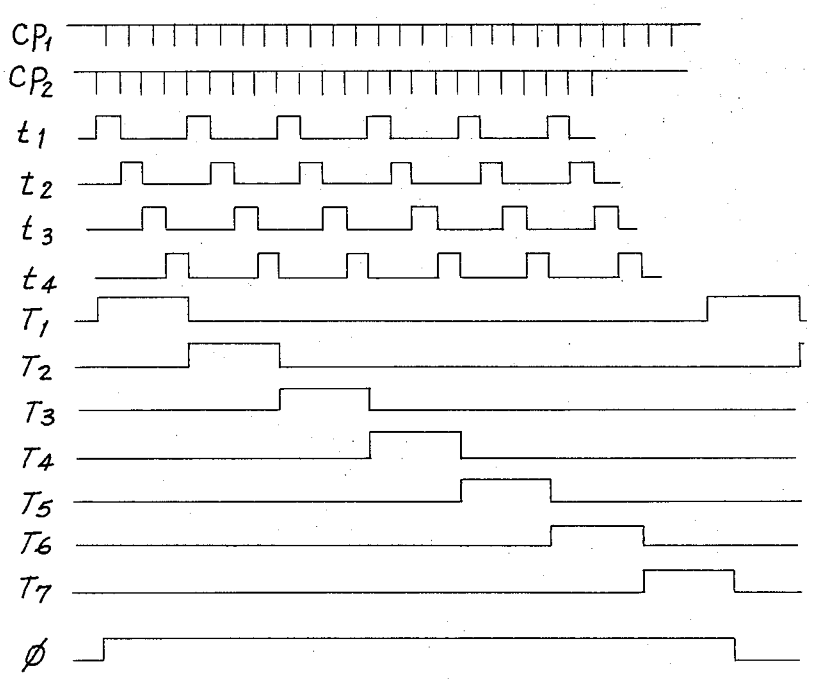
FIG. 4 is a chart showing pulses for the control of a synchronous calculator.

This calculator is composed of binomial total addition-subtraction calculators 1 and 2, a 4-bit shift register 9 and D-flip flops 8, 18, and 33. A number of terminals 36 through 44 provide inputs to this calculator. Terminal 36 gives a signal to direct the performance of an addition-subtraction calculation and directs the performance of a subtraction when the signal is "1" and of an addition when it is "0." Terminal 37 gives a signal to indicate a calculating figure, termial 38 is the input terminal for a calculating signal, terminal 39 is the input terminal for the resultant signal from the AND gating of $T_1$ $t_1$ as shown in FIG. 4, terminal 40 the time $t_1$, terminal 41 the time $t_2$, terminal 42 the time $t_3$, terminal 43 the time $t_4$ and terminal 44 the hexadic calculation timing.

Figures 2, 3, 5:
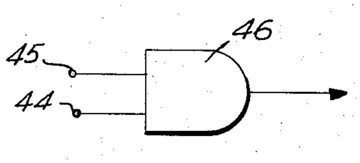
FIG. 2 shows a logic table of a binominal total addition-subtraction device in the circuit diagram of FIG. 1.
FIG. 3 shows the content of a register at a certain time of calculation.
FIG. 5 shows a gate for the logic circuit of FIG. 1.

The total addition calculators 1 and 2 include calcuated-figures input terminals 3 and 27 and calculating-figures input terminals 4 and 28, an addition-result-S or subtraction-result-D output terminal 6, output terminals 7 and 32 for place-up-C at the time of addition and for balance B at the time of subtraction, input terminals 34 and 35 for controlling the addition A and subtraction S, and terminals 5 and 29 for a 1 bit delayed signal. The logical table for these signals is shown in FIG. 2.

The data enters the shift register 9 in series, and the outputs thereof are taken out in parallel. The outputs correspond to 21, 22 and 23.

In performing addition and subtraction, it is necessary, as mentioned above, to detect a hexadic place-up to use it with the data in the next upper place and concurrently to make the correction S/D of the addition-subtraction calculator 1.

Considering the case of hexadic place-up as a correction needed when S/D is over 5, the logic thereof is expressed as $2^1 \cdot 2^2 + 2^3 + C/B$.

Similarly, as a decimal place-up is brought about when S/D is over 9, the logic thereof is expressed as $2^1 \cdot 2^3 + 2^2\ 2^3 + C/B$, which is something that has already been put into practice in conventional decimal addition-subtraction calculators.

In FIG. 1, calculator receives a signal composed by the shift register 9, the group of AND gates 10, 11, 12, 14, 15, 16, the OR gate 13 and the D-flip flop 8. Gate 17 is a gate for passing the signal which is delayed by 1 bit when C/B of the total addition-subtraction calculator 1 passes through D-flip flop 8. The gate 17 is closed at time $T_1$ $t_1$. The output of gate 17 feeds directly to terminal 5 and via gate 17' conditioned by signal $t_1$ to flip flop 18.

The gate 14 is a gate that, even when "1" does not appear at C/B of the total addition-subtraction calculator 1 in the case of the addition of 4 bits of one place (that is, when it gives a result of 1111 or below 15), generates a signal for place-up condition to enable the place-up to pass. This gate is closed at any time other than $t_1$.

The gate 15 is a gate to pass a signal for decimal place-up and is opened for decimal calculation. The gate 16 is a gate to pass a signal for hexadic place-up and is opened when hexadic calculation is to be done.

The afore-mentioned signals are supplied with the timing $t_1$ of FIG. 4. When the data of the next place enter the total addition-subtraction calculator 1 at the same time, they are read into D-flop flop 8 with the timing of $t_1$CP of FIG. 4 and, in the decimal and hexadic cases, S/D signals of 0110 and 1010 are respectively added or subtracted in compliance with the addition or subtraction directions and corrected to proper values. When the correction is performed decimally, the 0110 signal that has passed through the OR gate 22 passes through the gate 26 and enters the input terminal 28 of the total addition-subtraction calculator 2 and addition and subtraction are carried out with the output of shift register 9. The corrected answer is then taken out from the output terminal 31.

D-flip flop 33 delays the output of terminal 32 by 1 bit to form the input at terminal 29. The gate 30 blocks this input signal at time $t_1$. In the same way, when the correction is performed for a hexadic case, the 1010 signal that has passed the OR gate 21 passes through the gate 25 and enters the input terminal 28 of the total addition-subtraction calculator 2, and addition and subtraction are carried out with the output of shift register 9.

Next, a case wherein 1 hr. 25 mins. 42 secs. and 2 hrs. 40 mins. 19 secs. are added is explained using the afore-mentioned addition-subtraction circuit. In this case, hexadic calculations are needed for the second and fourth places (i.e., from seconds to minutes and from minutes to hours). The remaining places may be calculated decimally.

The state in which these two values are set in two registers is shown in FIG. 3. When the direction of addition signal is generated, the first place is added through the addition-subtraction calculator 1 at time $T_1$ and 1011 (i.e., 2 + 9 equals 11) is read into the shift register 9. As the content of register is not changed at times $T_2$ $t_1$, a signal that directs the requirement for place-up and correction treatment is generated. This signal is read into the D-flip flop 18 and this result is corrected by the addition-subtraction calculator 2 at time $T_2$. The output "1" of D-flip flop 18 enters the AND gates 25 and 26 but, since at this time a hexadic correction is not directed, the output of inverter 24 becomes "1" to open the AND gate 26. 1011 is added to 0110 and the first place becomes 0001 and is the output signal from the output terminal 31 at the end of $T_2$.

Next, 4 and 1 of the second place enter the addition-subtraction calculator 1 at time $T_2$ $t_1$, but as there is a place-up from the lower place at this time, the value read into the shift register 9 after passing through the addition-subtraction calculator 1 becomes 0110. At time $T_3$, a hexadic calculation is directed. The gate 16 opens at time $T_3$ $t_1$ and a control signal for place-up correction is dispatched. This signal becomes the place-up from the lower place at time $T_3$ and, when 5 and 0 of the third place are added, at the same time, enters respective terminals of the AND gates 25 and 26 and is read into D-flip flop 18 as a "1" signal. As the AND gate 25 is in an opened state at time $T_3$, the signal passes the data 1010 of the OR gate 21, and enters the addition-subtraction calculator 2 at time $T_3$ together with the data that have entered the shift register 9 as 0110 at time $T_2$, appearing at the output terminal 31 as 0000.

After that, if similarly the direction for hexadic calculation has been given at time $T_3$, the result appears as 4 hrs. 06 mins. 01 secs.

Similarly, when the lower place is read in up to the second place, since the second and fourth places are to be calculated in hexadic style, it is sufficient to give a direction for hexadic correction at the calculation times $T_3$ and $T_5$.

As described above, it is satisfactory, if at the time the hexadic correction must be applied, 1010 is supplied to the second addition-subtraction calculator.

When an input is sent into AND gate 46, as shown in FIG. 5, and the gate is opened and closed by the signal at terminal 45 that controls selection of an ordinary calculation or a time calculation, it becomes possible to make ordinary or time calculations arbitrarily.

Hereinabove a calculating machine was mentioned in which series type calculators are used. In a calculating machine of parallel type in which for one place 4 bits become an input in parallel, if the hexadic place-up and correction are enabled with such a timing for the place that the calculation should be done in hexadic style, the calculation of time can be simply performed.

In this way, the calculation of time can be rapidly treated mechanically in accordance with this invention, which proves to be very effective in the matters of selling and buying time. For example, in the calculation of salaries and overtime work wages, if minutes are converted into decimal form and by setting the starting and the finishing times with a function key, an L subtraction can be performed without any need for multiplying the hourly charge at all. Then the net hours are calculated and the salaries and wages are obtained by multiplying by the hourly charge.

Recently in facilities such as parking lots and liesure equipment, a charge per unit time is fixed and, by multiplying the same by the number of hours, a charge is calculated. In such matters, the times are subtracted and the charge per unit time is multiplied by ciphering or abacus. According to this invention, the total charge can be calculated by simply pushing a function key with the result being free from mistakes coming from mixed hexadic and decimal calculations. This makes it possible to run businesses quite easily with an accompanying reduction of personnel and with other numerous advantages.

What is claimed is:

1. A time calculator comprising first and second calculators, said first calculator receiving and adding or subtracting two time figures and producing a result, said second calculator receiving and combining said result with a further figure, means coupling said first calculator to said second calculator for the transfer of said result to the latter and responsive to said result and to a hexadic-decimal control signal for generating a decimal or hexadic correction signal which is transmitted to said second calculator as said further figure for combination with said result, said time figures being expressed as series of pulses and said means including a shift register coupled to said calculators to convert said result to parallel signals and a plurality of gates coupled to said shift register to detect when hexadic and decimal corrections are necessary and to generate an indicating signal for indicating the same; said means further comprising sources of hexadic and decimal correction signals, first and second gates respectively coupled to said sources of hexadic and decimal correction signals and a hexadic-decimal selection means coupled to and cooperating with said plurality of gates for selectively actuating one of said first and second gates; and means connecting said plurality of gates in feedback relation with said first calculator, the first said means further including a delay means coupled to said first calculator, said selection means comprising a flip flop connecting said delay means to said first and second gates for selectively actuating one of the said first and second gates.

2. A time calculator as claimed in claim 1 comprising means for controlling said calculators to add or subtract.

3. A time calculator as claimed in claim 1 comprising a source of timing signals generating a signal for each place in said time figures and a signal for each bit position in each said place and a gate connected between said delay means and said flip flop and actuated by said timing signals.

* * * * *